March 10, 1964     M. H. STAPLETON     3,124,105
DOOR FOR ANIMAL FEEDING EQUIPMENT
Filed Aug. 23, 1962
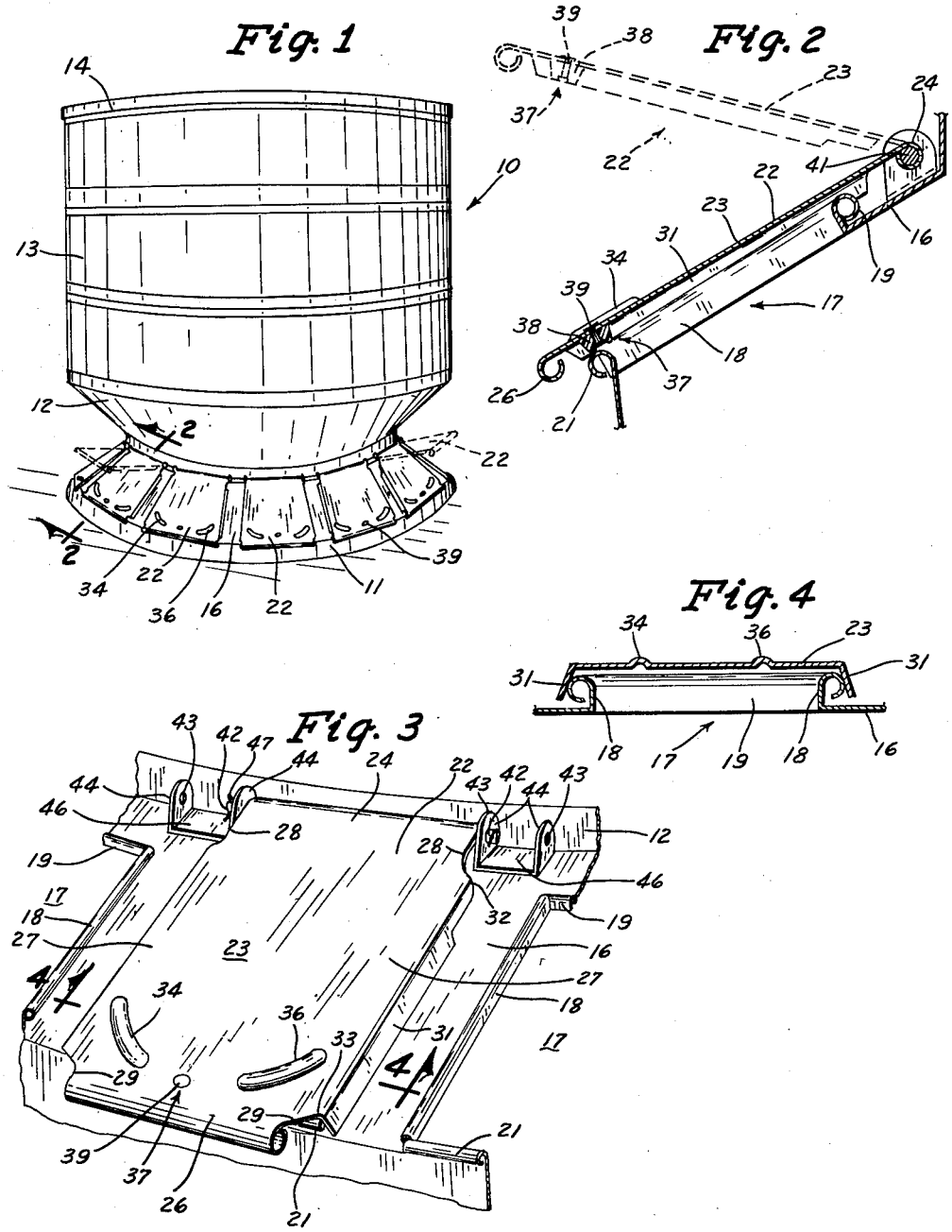
INVENTOR
MATHEW H. STAPLETON
BY
ATTORNEY

United States Patent Office 3,124,105
Patented Mar. 10, 1964

3,124,105
DOOR FOR ANIMAL FEEDING EQUIPMENT
Mathew H. Stapleton, National Ave., Jefferson, Iowa
Filed Aug. 23, 1962, Ser. No. 218,910
1 Claim. (Cl. 119—61)

This invention relates to animal feeding equipment and particularly to a door for closing and opening through which the animal feeds.

In this type of equipment, the animals use their noses or snouts to move the door to an open position, holding the door in this position until they are finished feeding. Upon the withdrawal from their feeding position, the door is left free to slam downwardly to its closed position by virtue of its own weight.

If the door is of a light gauge metal, it will split along the lines of stress due to the constant slamming. If a heavy gauge material is used, the increased mass of the door causes a relatively increased force of slamming. In the latter case, attempts have been made to spread the force of the fall on as much of the door as possible by aligning, for example, all edges thereof. This procedure, of course, causes an increase of the costs of the structure due to closer manufacturing tolerances.

It is therefore an object of this invention to provide an improved animal feeding door.

It is also an object of this invention to provide a door of this type with a prolonged life, as compared to that of conventional doors of this type, which doors are subject to being repeatedly slammed shut by virtue of their own weight.

Another object of this invention is to provide an animal feeding door of the type enumerated hereinbefore, where close manufacturing tolerances are not necessary, any resulting misalignment being of relative inconsequence.

Still another object of this invention is to provide an animal feeding door which need only be heavy enough to withstand the action of the animal opening the door.

Another object of this invention is in combining with the animal feeding door means particularly placed thereon for relieving the lines of stress set up within the material of the door upon its being slammed shut.

Still another object of this invention is to provide an animal feeding door capable of attaining the above enumerated objectives which is economical to manufacture, efficient and effective in use.

These objects and other features and advantages of this invention will become readily apparent upon reference to the following description when taken in conjunction with the accompanying drawing, wherein:

FIG. 1 is a perspective view of a round hog feeder including a preferred embodiment of my invention;

FIG. 2 is an enlarged sectional view of one hog door taken along the line 2—2 in FIG. 1, and showing the door in alternate closed and open positions;

FIG. 3 is an enlarged perspective detail view of one hog door and surrounding structure therefor, the door being shown in a closed position; and FIG. 4 is a sectional view taken along the line 4—4 in FIG. 3.

Referring now to the drawing, a round hog feeder of a commercially available type is indicated generally at 10 in FIG. 1. This feeder 10 is of a one piece heavy galvanized spun steel base 11 and cone 12, on which a circular, corrugated and ribbed side wall is mounted. A cover 14 is hingedly mounted on the side wall 13 for easy wagon or auger loading.

Granular feed disposed within the feeder 10 is adapted to be adjustably disposed within a trough (not shown) over which a circular panel portion 16 of the base is disposed in a slanted manner. A plurality of equally and arcuately spaced openings 17 of a substantially square outline, are formed within the panel by means of a plurality of rolled side lips 18, upper lips 19 and lower lips 21.

Each opening 17 is closed by a door 22 of a unitary structure. As the doors 22 are identical, only one will be described with like reference numerals applying to like parts.

Each door 22 includes a relatively flat main portion 23 (FIGS. 2 and 4) narrower in width across its upper edge 24 (FIG. 3) than across its lower edge 26, whereby the sides 27 of the door 22 are flared outwardly and diverge from the upper edge 24. Both upper and lower edges 24 and 26 respectively are rolled downwardly and inwardly, as best illustrated in FIG. 2. Each side 27 includes a gradual cutout 28 (FIG. 3) at the upper end, and a sharp cutback 29 at the lower end thereof.

The sides 27 are both provided with flanges 31 between the lower end 32 of the cutout 28 and the upper end 33 of the cutback 29. Each flange 31 depends downwardly and is slightly flared outwardly, as best illustrated in FIG. 4. As seen in FIG. 4, by virtue of the engagement of the side flanges 31 with the rolled side lips 18 of the opening 17, the opening is virtually watertight at its sides.

Adjacent the lower edge 26 of each door 22, a pair of curved ribs 34 and 36 (FIGS. 3 and 4) are formed in the main portion 23 of the door 22, the ribs being disposed along the perimeter of an imaginary circle. Intermediate and substantially on the same imaginary perimeter, a cushion device 37 (FIG. 2) is secured to the door 22. It will be noted by referrng to FIG. 3, that the cushion device 37 is disposed along the longitudinal axis of the door 22 adjacent the lower edge 26 thereof, and that the ribs 34 and 36 are equally and arcuately spaced on either side thereof, the center of the imaginary circle also falling on the longitudinal axis of the door adjacent the other end thereof.

Each cushion device 37 is comprised of a circular cushion 38 of rubber or the like, held in place to the door 22 by a rivet 39 or like fastening device. Referring to FIG. 2, the position of a door 22 is shown in dotted lines when the door is held in an open position by the snout of a hog, for example. The closed position of the door is shown in full lines, and it may readily be observed that the lower surface of the cushion 38 rests on and engages the upper surface of the rolled lower lip 21 of the respective opening 17 below the door 22. In the full line position of the door 22 in FIG. 2, the main portion 23 thereof extends completely over the entire length of the opening 17, and the side flange 31 of the door also extends above and below the upper and lower ends of each side lip 18.

To mount each door 22, a rod 41 is inserted through the rolled upper edge 24 thereof. Each end 42 of the rod 41 is inserted through an opening 43 provided in an adjacent ear 44 of a bracket 46. Each bracket 46 is secured to the panel 16 in arcuate spaced positions relative to the openings 17 and is provided with a pair of parallel upstanding ears 44. A cotter pin 47 or the like is inserted through the end 42 of each rod 41 for maintaining the rod in the bracket ears 44.

When mounted to the brackets 46, although each door 22 completely covers the opening 17 beneath it, only the cushion device 37 secured to the door 22 engages the panel 16. Thus, when an animal raises the door 22 to the dotted line open position thereof in FIG. 2, and then withdraws from the opening 17, when the door 22 slams shut to its full line position of FIG. 2, only the cushion device 37 contacts the panel 16 at the rolled lower lip 21, with the resultant force and shock of the slam being first taken by the cushion 38 and then by the remainder of the door 22.

Some changes may be made in the construction and arrangement of my door for animal feeding equipment, without departing from the real spirit and purpose of my invention, and it is my intention to cover by my claim, any modified forms of structure of use of mechanical equivalents which may be reasonably included within their scope.

I claim:

In an animal feeder having a feed trough:
a substantially flat panel disposed thereover;
the panel having a series of openings formed therein;
each opening defined by a top edge, a pair of spaced, rolled, straight side edges, and a rolled bottom edge;
a relatively flat door pivotally connected at one end to said panel;
said door having a pair of straight, spaced flanges along each side thereof, said flanges flared downwardly and engageable on their undersurfaces with said side edges;
said door covering said top edge and said bottom edge when said flanges engage said side edges;
a pair of arcuately spaced, curved ribs formed in said door adjacent the end opposite said pivotally connected end, said ribs disposed substantially along the periphery of an imaginary circle the center of which is on the longitudinal axis of said door, and said ribs equally spaced from and on opposite sides of said axis; and
a resilient element secured to said door on the underside thereof on the axis and intermediate said ribs, said element engageable with said bottom edge when said flanges engage said side edges.

References Cited in the file of this patent

UNITED STATES PATENTS

| | | |
|---|---|---|
| 1,339,763 | Johnson | May 11, 1920 |
| 1,701,338 | Rowles | Feb. 5, 1929 |
| 1,910,596 | Einsel et al. | May 23, 1933 |
| 2,226,615 | Killen | Dec. 31, 1940 |
| 2,522,635 | Pittenger et al. | Sept. 19, 1950 |
| 2,591,126 | Breck | Apr. 1, 1952 |
| 2,608,179 | Otto | Aug. 26, 1952 |
| 2,653,571 | Pax | Sept. 29, 1953 |